Sept. 29, 1959  C. G. ABBOT  2,906,257
SOLAR HEATER
Filed March 15, 1957  6 Sheets-Sheet 1

INVENTOR
CHARLES G. ABBOT
BY Cameron, Kerkam & Sutton
ATTORNEYS

Sept. 29, 1959    C. G. ABBOT    2,906,257
SOLAR HEATER

Filed March 15, 1957    6 Sheets-Sheet 3

INVENTOR
CHARLES G. ABBOT
BY Cameron, Kerkam & Sutton
ATTORNEYS

Sept. 29, 1959     C. G. ABBOT     2,906,257
SOLAR HEATER
Filed March 15, 1957     6 Sheets-Sheet 4

INVENTOR
CHARLES G. ABBOT
BY Cameron, Kerkam & Sutton
ATTORNEYS

Sept. 29, 1959     C. G. ABBOT     2,906,257
SOLAR HEATER Filed March 15, 1957     6 Sheets-Sheet 5

INVENTOR
CHARLES G. ABBOT
BY Cameron, Kerkam & Sutton
ATTORNEYS

Sept. 29, 1959

C. G. ABBOT 2,906,257

SOLAR HEATER

Filed March 15, 1957

INVENTOR
CHARLES G. ABBOT
BY Cameron, Kerkam & Sutton
ATTORNEYS

United States Patent Office 2,906,257
Patented Sept. 29, 1959

2,906,257
SOLAR HEATER
Charles G. Abbot, Hyattsville, Md.
Application March 15, 1957, Serial No. 646,267
10 Claims. (Cl. 126—271)

This invention relates to heaters and more particularly to heaters deriving their heat energy from solar radiations. Even more particularly this invention relates to indirect solar heaters, that is to solar heaters in which the heat collected from solar rays is conveyed some distance from the heat collecting element to the heat utilizing element.

Even more particularly this invention relates to heaters which are generally described in my Patent No. 2,247,830 of July 1, 1941 and to such heaters of greatly improved efficiency sometimes intended for permanent or semi-permanent installation.

Generally speaking, my invention comprises an improved solar heater which has an optical element designed to concentrate solar rays at a linear focus; which is preferably mounted with its axis and focal line parallel to the axis of the earth; and which has a heater element lying in its focal line, the heater element being filled with a liquid highly absorptive of sun rays and stable at high temperatures. The heater element is in communication with a suitable heat utilizing element located above the upper end thereof and has means therein to assist the circulation of the liquid in the heater element convectionally into the utilizing element with return therefrom by gravity.

The optical element is preferably arranged to rotate about its axis in its focal line and the axis of the heater element, the heater element rotating with the optical element at a rate equal to the rate of apparent movement of the sun.

It is accordingly an object of the present invention to provide a novel improved solar heater in which the heat from solar rays is more efficiency collected and conveyed some distance from the heat collecting element to the heat utilizing element.

Another object of this invention is to provide a novel improved solar heater in which a heat absorbing liquid is used to collect solar rays with minimum loss by radiation and is caused to flow by expansion to the heat utilizing element with minimum loss of heat and is then returned therefrom by gravity.

Another object of this invention is to provide a solar heater having a heater element of novel construction lying in the focus of the mirror which collects the solar rays which heater element rotates with the mirror and has a maximum polished surface to prevent loss of heat by radiation.

Another object of this invention is to provide an improved solar heating having a novel optical element or mirror construction particularly intended for large semi-permanent or permanent installations.

Another object of this invention is to provide a novel improved solar heater which may be of any desired small or large size without decreasing its efficiency or requiring redesign for maximum heat transfer to the utilizing element.

Another object of this invention is to provide a novel and efficient heat utilizing element particularly intended for the generation of steam for devices employing steam such as heaters, motors, cookers, and the like.

Another object of my invention is to provide a novel improved solar heater which is highly efficient, relatively compact, even in large semi-permanent or permanent installations, relatively cheap to manufacture, durable and easily used by the inexperienced.

Other and further objects of my invention will appear as the description thereof proceeds.

The improved solar heater of the present invention is capable of receiving a variety of expressions in many differing embodiments and over a wide range of sizes both portable, semi-permanent, and permanent installations. For the purposes of illustration an illustrative embodiment of the present invention is shown in the accompanying drawings and is described hereinafter for purposes of illustration only, and is not to be construed as limiting the present invention, reference being had to the appended claims to determine the scope of the present inventive concept.

The intensity of solar heat per unit area is so feeble compared to heat provided by a fuel such as coal or oil that, although the sun's rays are free, the interest on the cost of a solar heater exceeds the cost of fuel, for equal output, unless a very high efficiency is obtained in the solar heater.

The solar heater disclosed in my Patent No. 2,247,830, referred to above, is efficient but very high degrees of efficiency must be obtained before a solar heater can become commercially acceptable. In particular, the rays reflected to the south of the mirror in summer or the rays reflected to the north of the mirror in winter must be captured to reduce the proportion of heat loss. These lost rays cannot be saved by making the mirror long compared to its width since this inevitably increases the loss of heat from the heater element or focus tube by radiation.

The heater element or focus tube should be highly polished over a maximum amount of its surface area to reduce heat loss by radiation.

These heat losses can be minimized and the percentage of energy of the solar rays intercepted by the mirror useful for heating can be significantly increased without materially increasing the cost of the solar heat by providing a plane reflecting element at the lower or south end of the parabolic mirror after March 20 of each year and by installing this plane mirror at the north end of the parabolic mirror after September 20 of each year. This plane mirror is placed at right angles to the polar axis and reflects upon the focus tube the solar rays which would otherwise be lost.

If the heater element or focus tube is rotated with the parabolic mirror as the parabolic mirror rotates to follow the apparent position of the sun more than half of the surface of the focus tube may be brightly polished to prevent heat loss by radiation and the focus tube will always present the same part of its surface toward the mirror to receive the reflected solar rays.

Figure 1:
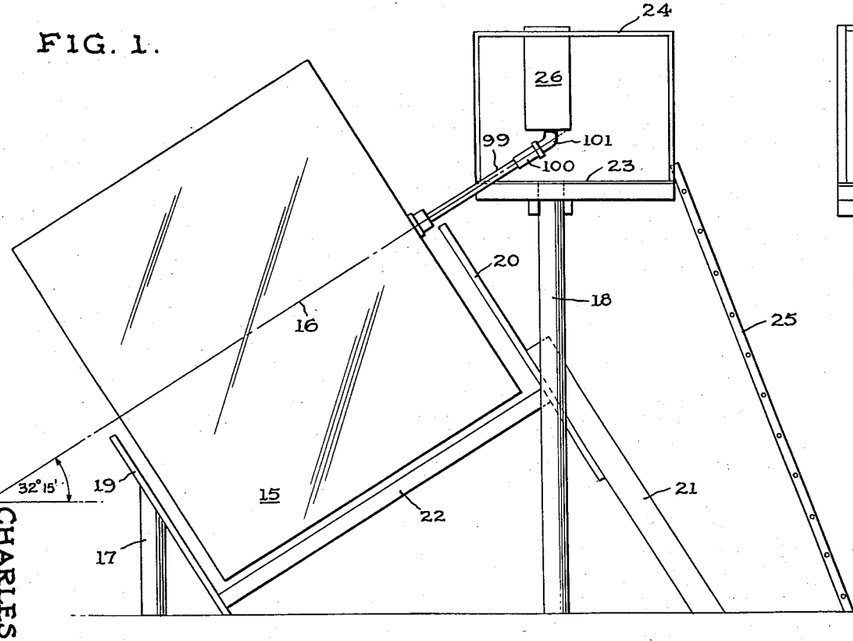
Fig. 1 is a somewhat schematic drawing of an illustrative embodiment of the present invention suitable for a permanent type of installation showing the relative position of the optical element or mirror and of the heat utilizing element.
Figure 2:
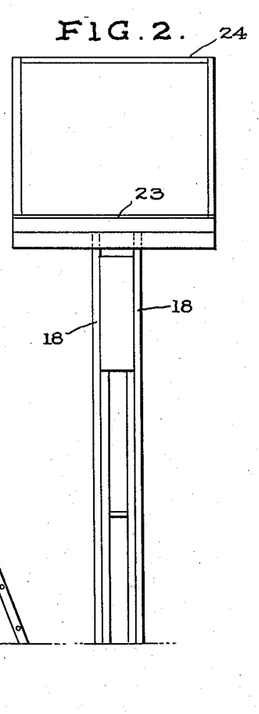
Fig. 2 is a view of a part of the embodiment of Fig. 1 as seen from the right in Fig. 1.

These advantages are obtained in the embodiment of the present invention shown in the drawings and in the several figures, in which like reference characters indicate corresponding parts. With particular reference to Figs. 1 and 2, a semi-permanent or permanent type of relatively large installation is there shown with the mirror generally shown at 15 mounted for rotation upon an axis indicated at 16 which is parallel to the axis of the earth and therefore lies in a north-south direction. Suitable vertical supports 17 and 18 are fixed to or in the ground to support parallel members 19 and 20, respectively, which in turn support the trunnions of the mirror 15 as will more fully appear hereinafter.

Member 20 may be additionally supported by extension 21 the lower end of which is fixed to or mounted in the ground and members 19 and 20 are spaced by a suitable cradle member 22. Upright 18 may support at its upper end a suitable platform 23 provided with a railing 24 to which access is gained by ladder 25. Platform 23 supports the heat utilizing element generally indicated at 26.

Figure 3:
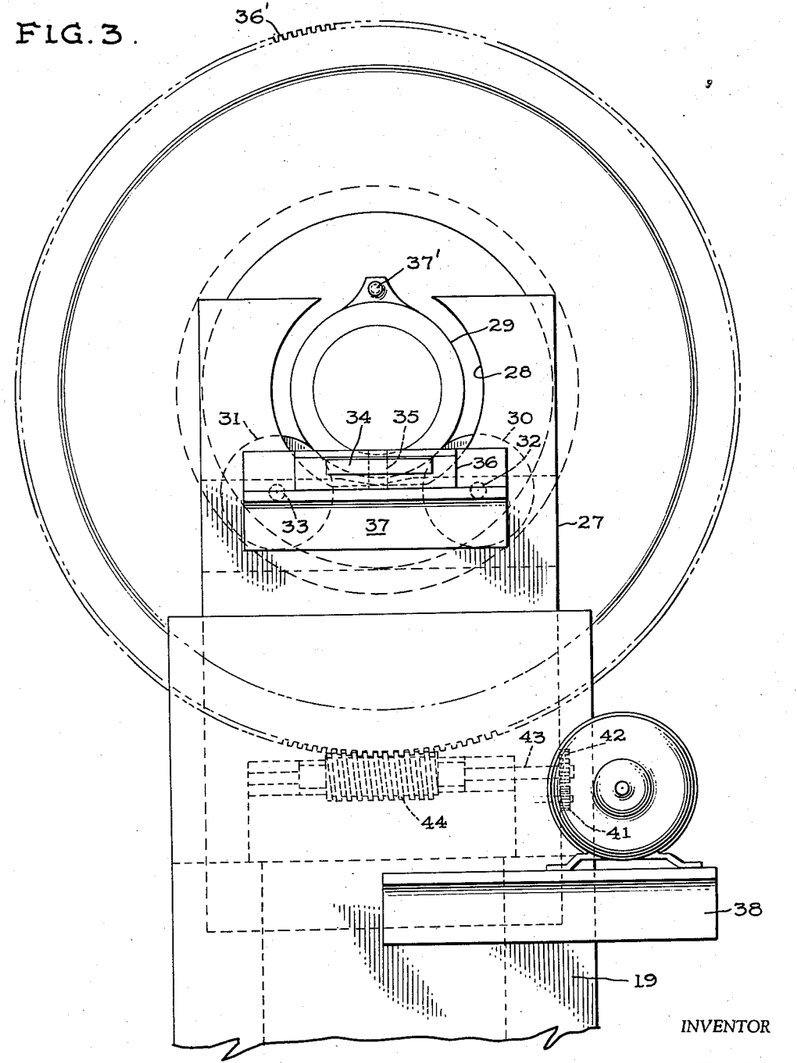
Fig. 3 is an enlarged detail of suitable bearings for the low or south end of the mirror of Fig. 1 and of suitable apparatus for rotating the mirror of Fig. 1 at a rate equal to the rate of apparent movement of the sun.
Figures 4, 11:
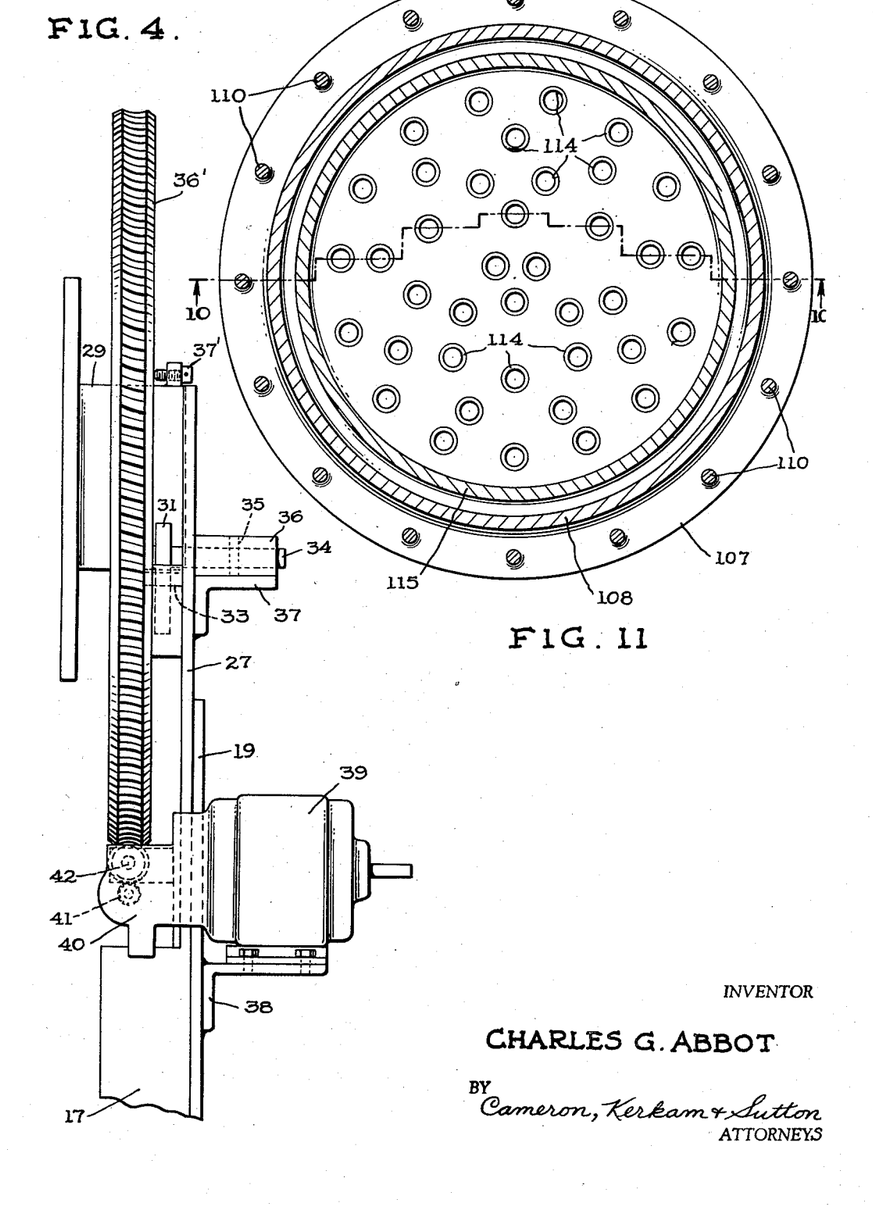
Fig. 4 is a side view of the apparatus of Fig. 3 as seen from the right in Fig. 3.
Fig. 11 is a view from above of the heat utilizing element of Fig. 10 on the lines 11—11 thereof.

The mechanism for rotating mirror 15 through approximately 15° of rotation per hour to follow the apparent position of the sun is shown in Figs. 3 and 4. This mechanism is located at the south or lower end of the mirror and is secured to or forms a part of the upper end of element 19. The upper end of element 19 carries extension 27 which is circularly cut away at 28 to receive trunnion 29 supporting the lower or south end of mirror 15. Spaced rollers 30 are mounted for rotation on pins 32 and 33, respectively, engage the outer surface of trunnion 29 to support the same for rotation of the mirror in axis 16.

A third roller 34 is mounted for rotation on pin 35 and is arranged at right angles to rollers 30 and 31 to engage the lower end of trunnion 29 to act as a thrust bearing to prevent axial displacement of the mirror 15. Roller 34 is mounted in a suitable housing 36 supported by bracket 37 which is secured to plate 27. A suitable worm gear 36' is mounted on trunnion 29 and is locked in position by set bolt 37'. When bolt 37' is loosened the angularity of mirror 15 with respect to the sun can be adjusted.

The second bracket 38 is mounted upon element 19 and supports a suitable constant speed electric motor 39. Motor 39 includes a suitable gear box 40 and rotates gears 41 and 42, gear 42 in turn rotating shaft 43 which drives worm 44. Worm 44 engages gear 36' and rotates the same, the speed of motor 39 and the ratios of gears 41, 42, 44, and 36', being selected to provide a constant rotation for mirror 15 of approximately 15° per hour.

Figure 5:
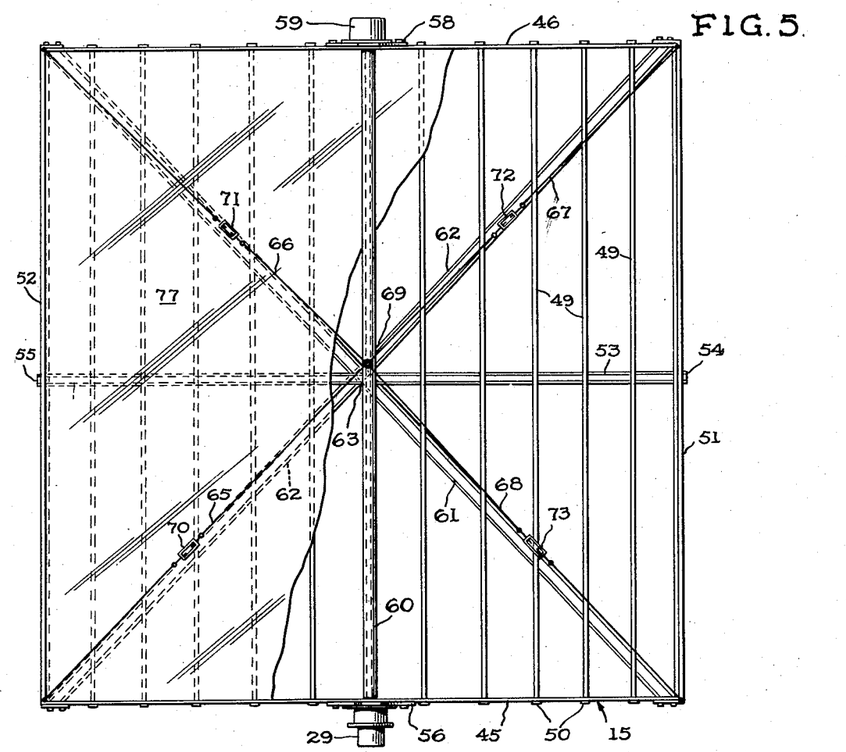
Fig. 5 is a view from above of a mirror to be used in the embodiment of Fig. 1.
Figures 6, 8:
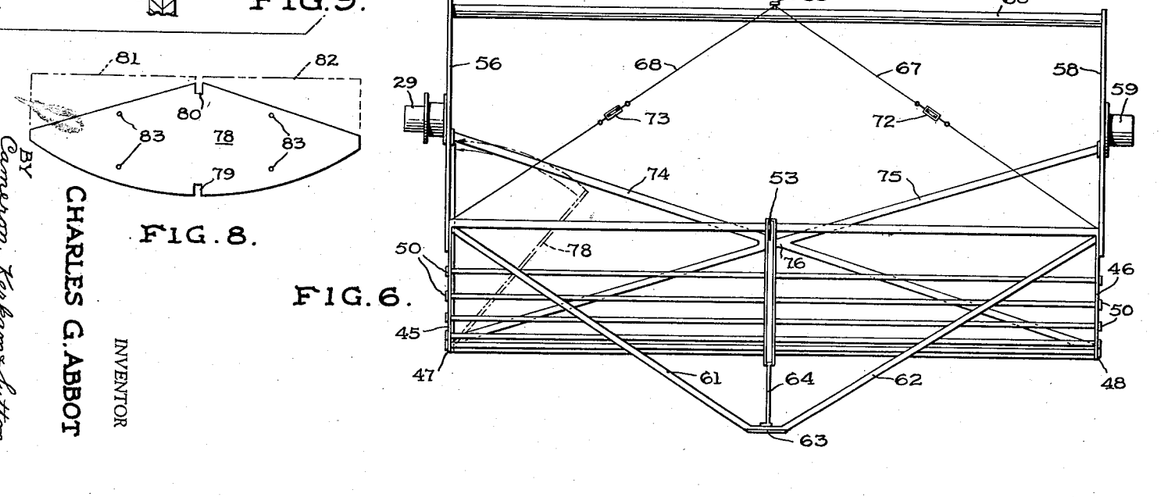
Fig. 6 is a side view of the mirror of Fig. 5.
Fig. 8 is a view of an auxiliary mirror which may be used with the mirror of Fig. 5.
Figure 7:
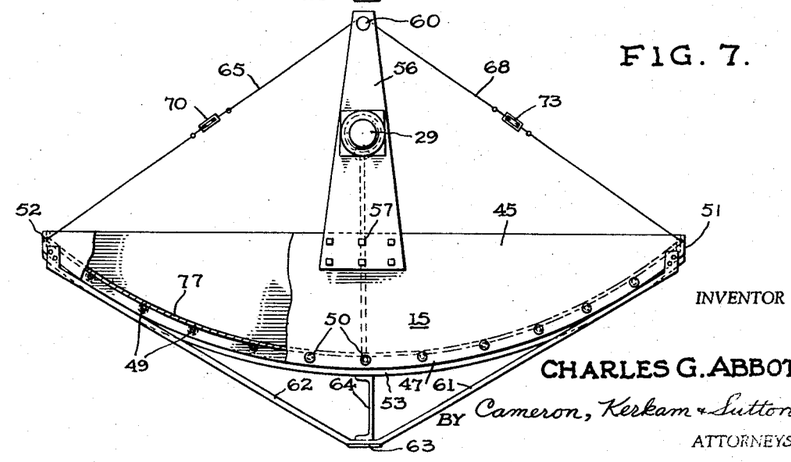
Fig. 7 is an end view of the mirror of Fig. 5 as seen from the south or lower end thereof.

The details of parabolic mirror 15 are shown in Figs. 5, 6 and 7. In determining the shape of parabolic mirror 15 I prefer to use the parabolic curve generated by the equation $Y^2=10X$. This equation represents a compromise of three governing considerations. The values of X at the outer ends of the parabola should preferably be less than the focal value of X because the reflecting surface should be under-slung as much as possible below the axis of the mirror assembly to reduce the angular width subtended by the mirror at the focus so that a maximum of the circumference of the focus tube can be polished to reduce heat loss by radiation. The second consideration is that the curvature of the parabola for this purpose should not be great so that the length of the parabola is not much greater than its chord to thus reduce the cost of the mirror. The third consideration is that the lower the mirror is slung below the axis of rotation the larger the device and the greater the weight of the counterbalance thus increasing cost.

A mirror shaped according to the equation $Y^2=10X$ provides a satisfactory compromise of these considerations.

Such a mirror is shown in Figs. 5, 6 and 7 and comprises metal end-pieces 45 and 46 preferably of aluminum and shaped at their bottoms in parabolic curves 47 and 48, respectively, meeting the equation $Y^2=10X$. A suitable number of metal tubes 49 extend between plates 45 and 46 following the curve of the edges 47 and 48 and are secured thereto by suitable means such as bolts 50 which pass through plates 45 and 46 and are threaded interiorly within tubes 49. Metal members 51 and 52 extend between adjacent upper corners of plates 45 and 46 and are suitably secured thereto to strengthen the mirror assembly.

A curved reinforcing beam 53 lies beneath tubes 49 and extends at right angles thereto and is secured to each as by screws and is secured to members 51 and 52 at 54 and 55, respectively. An upright 56 is medially secured to end 45 as by bolts 57 and a parallel upright 58 is secured to end plate 46 in similar manner. Upright 56 supports trunnion 29 and upright 58 carries the opposite trunnion 59. Uprights 56 and 58 extend vertically above their trunnions and support between them a lead-filled tube 60 which acts as a counter-balance for the weight of the mirror assembly. A cheaper substitute might be a concrete slab of rectangular cross section, not wider than the lead-filled tube.

The above described mirror assembly is further braced and stiffened by diagonal members 61 and 62 which cross at 63 and are suitably secured at opposite corners of ends 45 and 46, respectively, and are spaced from the center point of the bottom of mirror 15 by post 64. Post 64 may be extended and affixed to counterweight 60. The mirror structure is further stiffened by diagonally extending wires 65, 66, 67 and 68 which extend from a common central point 69 on tube 60 each being secured to an appropriate upper corner of end plates 45 and 46. Wires 65–68 are suitably tensioned by turn buckles 70–73, respectively. Further bracing of the mirror structure as seen in Fig. 6 is obtained by metal members 74 and 75 which cross at 76, member 74 extending from adjacent trunnion 29 to the opposite lowest point of end plate 46 and member 75 extending from adjacent trunnion 59 to the opposite lowest portion of end plate 45.

A brightly polished reflecting metallic sheet 77, preferably of aluminum, is supported upon tubes 49 and is appropriately secured to each as by small metal screws or wire loops and sheet 77 constitutes the reflecting surface of the mirror. Sheet 77 extends from member 52 to member 51 and follows the curve of the parabola $Y^2=10X$.

As noted above, an auxiliary mirror may be employed with the mirror construction above described to reflect the rays of the sun which might otherwise be lost. This auxiliary mirror is placed at the south end of mirror 15 in March of each year in a position at right angles to the long axis of mirror 15 and in September this auxiliary mirror is placed at the north end of mirror 15 again at right angles to the long axis thereof. A suitable auxiliary mirror for this purpose is shown generally at 78 in Fig. 8. Mirror 78 is preferably made from a sheet of suitable metal such as aluminum in the form of a segment of the parabola $Y^2=10X$ and is cut away in notches 79 and 80 so as to be swung into position within mirror 15 as shown in dotted lines in Fig. 6, notch 79 seating over brace 75 and notch 80 seating over brace 74. If additional reflecting surface is desired mirror 78 may be extended as shown in dotted lines at 81 and 82. If the metallic sheet from which mirror 78 is formed is not sufficiently reflecting the inner side of this sheet may be covered with a suitable reflecting surface such as a thin sheet of reflecting aluminum. Mirror 78 may be secured in position within mirror 15 by any suitable means and holes 83 are provided for suitable fastenings.

Figure 9:
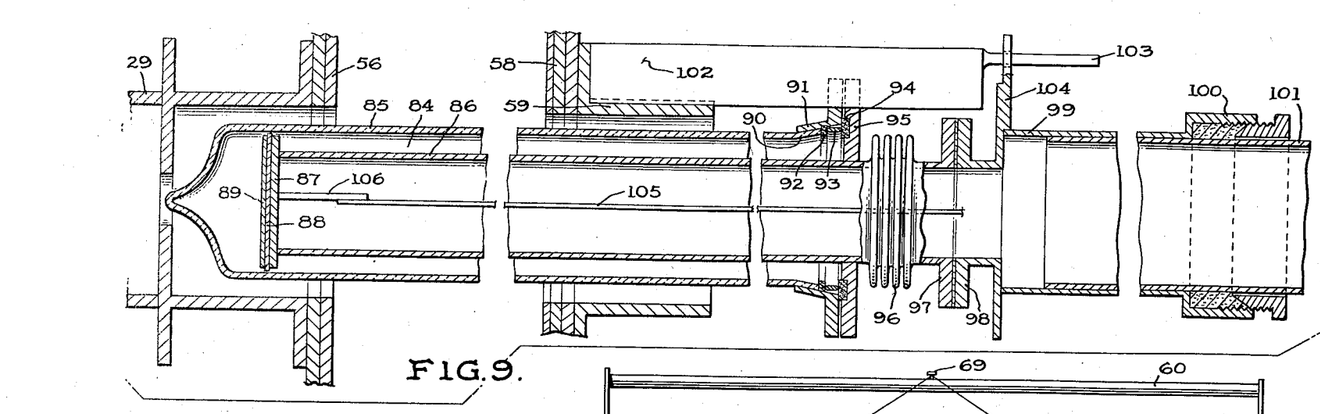
Fig. 9 is a sectional view of the heater element which is arranged in the focal line of the mirror.

The novel heater element or focus tube of the present concept is shown generally at 84 in Fig. 9 and is there seen to include an outer glass tube 85 closed at its lower end and an inner copper tube 86. The space between tubes 85 and 86 is evacuated. Copper tube 86 is closed at its lower end by a brass plate 87 suitably secured thereto as by brazing and a mica disk 88 is mounted between plate 87 and plate 89 to space tube 86 centrally within tube 85. The lower ends of tubes 85 and 86 extend into hollow trunnion 29. The use of metal for innertube 86 gives higher conduction than glass and permits use of transparent heat exchange liquids.

Glass tube 85 is conically expanded at 90 and a flange 91 is mounted thereon. An annular gasket 92 seats on the end of tube 85 within flange 91 and receives an edge sharpened ring 93. Ring 93 bears in a second gasket 94 mounted in disk 95 which is brazed to the end of tube 86. When flange 91 is drawn toward engagement with disk 95 sharpened ring 93 seats in gaskets 92 and 94 to form a vacuum tight seal to prevent loss of vacuum in the space between tubes 85 and 86. This construction of an efficient seal avoids expensive and risky heat methods of sealing glass to copper.

Tube 86 is provided with a resilient flexible portion 96, here shown as a metallic bellows, and bellows 96 extends to flange 97. Flange 97, in turn, is secured to flange 98 with a fluid tight seal and flange 98 connects the focus tube 84 to the larger diameter conduit 99 which terminates in stuffing box 100. Tube 101 leads from stuffing box 100 to the heat utilizing element 26.

To insure rotation of focus tube 84 with mirror 15 trunnion 59 is provided with an axially extending link 102 which has an extension 103 of reduced diameter. Extension 103 passes through a suitable hole in annular flange 104 which is formed as an integral part of or is secured to flange 98 and conduit 99. Thus, when mirror 15 rotates trunnion 59 also rotates and rotates focus tube 84 with tube 99 rotating over tube 101 with no loss of fluid therebetween by reason of stuffing box 100.

Copper tube 86 is filled with a suitable heat absorbing liquid and is divided into two portions by an axially and diametrically extending metal strip 105 which is held in position by brackets 106. Strip 105 assists in the circulation of the heat absorbing liquid contained in tube 86 by providing therein an ascending and descending channel for this heat exchange liquid.

Tube 86 is blackened over approximately the four-tenths of its circumference which receives the reflected solar rays from mirror 15 to absorb all of the solar rays coming from mirror 15 and is brightly polished over its remaining surface to cut down loss of heat by radiation. Glass tube 85 is transparent adjacent the blackened portion of the circumference of tube 86 and the remainder of the inner circumference of glass tube 85 is metal plated and polished to reduce heat loss by radiation. All of the interior circumference of glass tube 85 is metal plated and polished where tube 85 extends beyond mirror 15 to reduce loss by heat radiation. Tube 86 is polished over its entire area where it extends beyond mirror 15 and bellows 96, flange 98, tubes 99 and 101, and stuffing box 100 are also polished to reduce heat loss by radiation.

Figure 10:
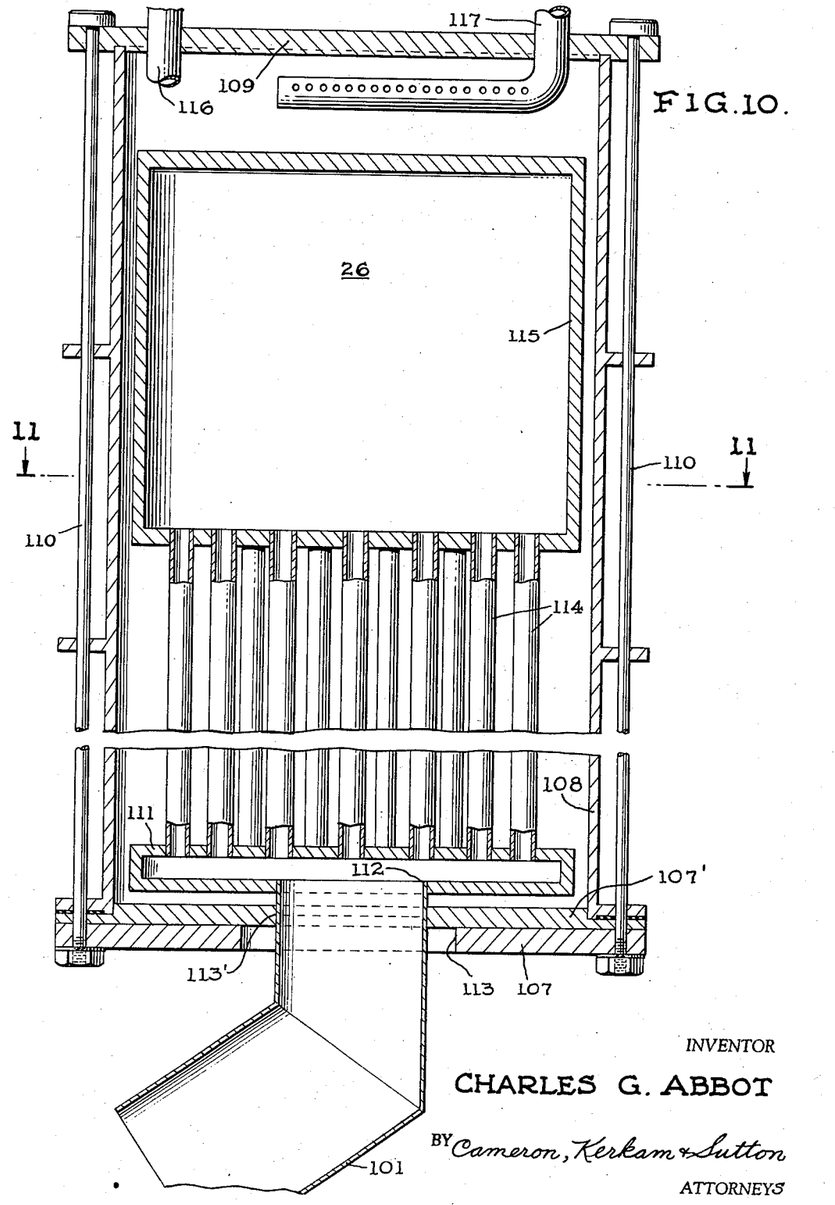
Fig. 10 is a sectional view of the heat utilizing element seen in Fig. 1.

The details of the heat utilizing element 26 shown generally in Fig. 1 are shown in detail in Figs. 10 and 11. Element 26 includes a circular reinforcing plate 107, a base plate 107', a cylindrical side wall 108 and an upper circular top plate 109 the assembly being held firmly together in fluid-tight relationship by connecting rods 110. A hollow header 111 is mounted within cylinder 108 and tube 101 is in communication therewith at 112, tube 101 passing through plate 107 at opening 113 and being brazed to base plate 107' and 113'. A plurality of heat exchange tubes 114 extend in parallel relation from header 111 and establish communication between header 111 and expansion chamber 115. Expansion chamber 115 is of suitable size and is mounted within cylinder 108. Water is admitted to the interior of cylinder 108 through pipe 116 and surrounds expansion chamber 115 and heat exchange tubes 114. Steam is taken from the interior of cylinder 108 by perforated pipe 117 for use as indicated above. Tube 101, header 111, heat exchange tubes 114, and a part of expansion chamber 115 are filled with the heat absorbing liquid filling tube 86.

The function and operation of the novel improved solar heater of the present invention should now be apparent from the description above. With this solar heater installed as described, the initial adjustment of the mirror 15 is obtained by loosening set screw 37' and manually rotating mirror 15 to the proper position. Thereafter set screw 37' is tightened and motor 39 is started. Motor 39 rotates mirror 15 through approximately 15° per hour to follow the apparent position of the sun so that a maximum amount of solar rays are reflected by mirror 15 to focus tube 84. Focus tube 84 rotates with mirror 15 so as to present its blackened surface to the reflected rays of the sun for maximum absorption of heat and to provide a maximum polished area to reduce loss of heat by radiation. Outer glass tube 85 always presents its transparent portion to the reflected rays of the sun and has a maximum area metal coated and polished to prevent loss of heat by radiation. The heat absorbing liquid within tube 86 circulates by expansion and convection to heat utilizing element 26 with minimum loss of heat and heat utilizing element 26 efficiently converts the absorbed heat into useful form, steam, which may then be employed as desired.

It should now be apparent to those skilled in the art that the present invention in every way satisfies the several objectives described above.

Changes in or modifications to the above described illustrative embodiment of this concept may now be suggested without departing from the present invention. Reference should therefore be had to the appended claims to determine the scope of this invention.

What is claimed is:

1. In a solar heater of the type in which a parabolic mirror is rotated to follow the apparent position of the sun and reflects solar rays on a focus tube in its axis of rotation containing a heat absorbing liquid supplying heat to a heat utilizer, means for rotating said focus tube with said mirror to maintain their relative positions unchanged including a mechanical coupling between one end of said focus tube and the adjacent end of said mirror.

2. A focus tube as described in claim 1 coated with ray absorptive material over its area within the angle subtended at the line of focus by said mirror and polished over its remaining surface.

3. A focus tube as described in claim 2 including a diametral inner partition extending along the length of and terminating short of the lower end of said focus tube whereby ascending and descending channels for the heat absorbing liquid are formed.

4. A focus tube as described in claim 2 having a surrounding outer tube spaced therefrom to provide an evacuated space therebetween, said outer tube being transparent to solar rays within the angle subtended at the line of focus by said parabolic mirror and being polished over the remainder of its area.

5. A focus tube as described in claim 2 having a surrounding outer tube spaced therefrom to provide an evacuated space therebetween, said outer tube being closed at its end and flared at its other end away from the heat utilizer, a collar mounted on the flared portion of said outer tube, an annular flange sealed to said focus tube and extending parallel to said collar, an annular gasket carried on said flange, an annular gasket mounted at the end of said outer tube and beneath said collar, and a ring mounted between said gaskets whereby an airtight seal is obtained between said tubes.

6. A focus tube as described in claim 5 including a heat insulating ring spacing said focus tube from said outer tube at its end adjacent the closed end of said outer tube.

7. In a solar heater of the type in which a parabolic mirror is rotated to follow the apparent position of the sun and reflects solar rays on a focus tube in the axis of rotation containing a high boiling point heat absorbing liquid supplying heat to a heat utilizer, linkage for rotating said focus tube with said mirror, a metallic bellows connecting said focus tube and a coupling, a tube extending from said coupling, a second tube in telescoping relationship with said first tube and connected to said heat utilizer and a stuffing box permitting relative rotation of said first and second tubes and forming a liquid tight seal therebetween.

8. In a solar heater as described in claim 7, said heat utilizing element comprising a housing, a plurality of heat exchange tubes in said housing in communication at one end with said second named tube, an expansion chamber connected to the other ends of said heat exchange tubes, and a vaporizable liquid in said housing surrounding said heat exchange tubes and said expansion chamber.

9. In a solar heater as described in claim 7 in which said bellows and said first and second named tubes are highly polished to reduce heat loss by radiation.

10. In a solar heater of the type in which a cylindric parabolic mirror is rotated to follow the daily positions of the sun and reflects solar rays on a linear focus tube in its axis of rotation parallel to the axis of the earth containing a heat absorbing liquid supplying heat to a heat utilizer, a plane mirror removably and interchangeably attachable at the ends of said parabolic mirror at right angles to said focus tube in a manner to intercept solar rays tending to pass beyond the extremities of said parabolic mirror due to seasonal change, and to reflect such rays back upon said parabolic mirror and thence upon said focus tube.

References Cited in the file of this patent

UNITED STATES PATENTS

| | | |
|---|---|---|
| 528,255 | Monks | Oct. 30, 1894 |
| 670,917 | Eneas | Mar. 26, 1901 |
| 787,145 | Brown | Apr. 11, 1905 |
| 811,274 | Carter | Jan. 30, 1906 |
| 1,047,554 | Nichols | Dec. 17, 1912 |
| 1,215,555 | Langevin | Feb. 13, 1917 |
| 1,399,613 | Gower | Dec. 6, 1921 |
| 1,628,737 | Oliver | May 17, 1927 |
| 1,649,120 | Knisker | Nov. 15, 1927 |
| 1,730,783 | Reszkowski | Oct. 8, 1929 |
| 1,814,897 | Coxe | July 14, 1931 |
| 1,946,184 | Abbot | Feb. 6, 1934 |
| 2,133,649 | Abbot | Oct. 18, 1938 |
| 2,205,378 | Abbot | June 25, 1940 |
| 2,249,642 | Turner | July 15, 1941 |
| 2,460,482 | Abbot | Feb. 1, 1949 |
| 2,623,436 | Olson | Dec. 30, 1952 |
| 2,707,903 | Trombe | Mar. 10, 1955 |

FOREIGN PATENTS

| | | |
|---|---|---|
| 824,726 | France | Feb. 15, 1938 |
| 919,268 | France | Mar. 4, 1947 |

UNITED STATES PATENT OFFICE

CERTIFICATE OF CORRECTION

Patent No. 2,906,257 September 29, 1959

Charles G. Abbot

It is hereby certified that error appears in the printed specification of the above numbered patent requiring correction and that the said Letters Patent should read as corrected below.

Column 1, line 62, for "heating" read -- heater --; column 6, line 75, and column 7, line 1, strike out "away from the heat utilizer" and insert the same after "end", first occurrence, in column 6, line 75.

Signed and sealed this 29th day of March 1960.

(SEAL)
Attest:

KARL H. AXLINE
Attesting Officer

ROBERT C. WATSON
Commissioner of Patents